Reissued Sept. 29, 1942

Re. 22,189

UNITED STATES PATENT OFFICE 22,189

LUBRICATING COMPOSITION

Carl F. Prutton, Cleveland, and Albert K. Smith, Shaker Heights, Ohio, assignors to The Lubri-Zol Development Corporation, Cleveland, Ohio, a corporation of Delaware No Drawing. Original No. 2,255,985, dated September 9, 1941, Serial No. 241,606, November 21, 1938. Application for reissue July 23, 1942, Serial No. 452,116

13 Claims. (Cl. 252—54)

In U. S. Patents Nos. 1,986,645 and 1,986,651 it is taught that the lubricating properties of a lubricating composition may be materially improved and extreme pressure characteristics imparted to lubricants such as mineral lubricating oil, by the addition thereto of minor amounts of halogenated carbon ring compounds.

This application is a continuation in part of co-pending applications Serial No. 31,720, now Patent No. 2,137,782, and Serial No. 170,500 filed October 22, 1937, now Patent No. 2,204,620.

It has been explained that the reason why such compounds thus improve the extreme pressure characteristics of the lubricant probably is due to the fact that such addition agents chemically react with the bearing surfaces under the conditions imposed by relative movement and extreme pressure between the bearing surfaces to form a microscopic film of a metallic halide which prevents seizing between the bearing surfaces by acting as an anti-fluxing agent.

The halogenated carbon ring compounds were indicated as preferable in said patents due to the fact that such compounds are relatively stable, i. e., they do not readily hydrolyze in the presence of moisture which usually occurs in varying quantities in mineral oils. In other words, the halogenated carbon ring compounds are sufficiently stable so that decomposition and attack thereof upon the metallic surfaces occurs only in the areas where extreme pressure is encountered, i. e., on the bearing surfaces.

One theory of the action of halogen compounds, specifically chlorine compounds, in increasing film strength, assumes that, as above indicated, under the stress of the rubbing action of bearing surfaces in motion under load, chlorides of the bearing metals are formed on their surfaces and exert an anti-fluxing effect in preventing subsequent fusing of the two surfaces. This surface reaction, however, to take place with sufficient effectiveness depends upon the hydrolysis of the chlorine compound as a simultaneous intermediate reaction. These reactions may be expressed as follows:

(1) $RCl + H_2O \rightarrow HCl + ROH$ (2) $M + HCl \rightarrow MCl + H$ where R is an organic radicle and M is one of the metals of the bearing surfaces.

(*Note.*—The hydrogen evolved by (2) probably would act to reduce one or more of the organic compounds rather than to appear as free hydrogen.)

The correctness of the foregoing theory is substantiated by the fact that when a chlorinated hydrocarbon is added to a hydrocarbon mineral oil and the mixture thoroughly freed from moisture by the action of dehydrating agents, the film strength is no more than that of the oil alone. Exposure of the mixture to the atmosphere so that it may absorb a slight amount of moisture will then cause an increase in the film strength.

Since the presence of a large amount of moisture and especially of free water is objectionable in a lubricant besides being a highly variable factor in normal service, it is advisable to supply an oil soluble substitute for the same.

It is the principal object of this invention, therefore, to provide a lubricating composition as the type utilizing halogenated organic compounds as the extreme pressure addition agent but so modified as to be effective in the manner defined without being dependent upon the presence in the lubricating composition of some addition material such as water.

Other objects of our invention will appear as the description proceeds.

To the accomplishment of the foregoing and related ends, said invention, then consists of the means hereinafter fully described and particularly pointed out in the claims.

The following description sets forth in detail one approved combination of ingredients embodying our invention, such disclosed means constituting, however, but one of various forms in which the principle of the invention may be used.

Broadly stated, this invention comprises the use as a lubricant of oxygen and halogen bearing organic compounds and more specifically, oxygen and halogen bearing organic ring compounds, either used alone or incorporated with any suitable oil base.

The oxygen which is included in the molecule of the addition agent acts to increase the effectiveness of the latter in raising the film strength of a mineral oil to which the addition agent is added or to improve the lubricating properties of the halogenated compound when used without the addition of some other lubricant. The oxygen probably acts in the same way as water in making possible the formation of hydrochloric acid as an intermediate step in the surface reaction above explained.

By combining in a single molecule the halogen and the oxygen atoms, a lubricant is affected in two ways:

*First.*—The oxygen is always available at the exact point where required; and

*Second.*—The molecule is more strongly absorbed by metal surfaces than similar halogen compound which do not contain oxygen.

The latter circumstance enhances the effect of small amounts of such compounds because it is equivalent to an increase in concentration of the compound at the bearing surfaces.

We have found that certain oxygen-containing organic ring compounds which have been chlorinated and added to a lubricating oil are capable of improving the properties of such oil, particularly when employed for "thin-film" lubricating purposes. The addition of these certain oxygen containing organic ring compounds which have been chlorinated and added to the lubricating oil have been found to improve the properties thereof to an even greater extent than certain similar chlorinated hydrocarbons, notably when added in very small amounts.

The halogen and oxygen-containing organic ring compounds added to a suitable oil base are, as above indicated, preferably of the chlorinated species and particularly the compounds which have been found to produce very satisfactory results, may be classified as follows, viz:

I. "Carbon ring" type compounds:

(*a*) Of the aromatic, or allied type, including oxygen and halogen bearing derivatives of benzene, diphenyl, naphthalene, anthracene, etc., and homologs of them, also such derivatives of compounds of the bridged ring type, such as the terpenes, and related compounds.

(*b*) Of the class including such derivatives of the cyclo-aliphatic compounds such as cyclo-paraffins, cyclo-olefines, cyclo-acetylenes. Examples of this class are oxygen and halogen-bearing derivatives of hydrogenated aromatic compounds, such as the following:

(1) Hydrogenation products of benzene (e. g. cyclohexane, cyclohexene, cyclohexadiene).

(2) Hydrogenation products of naphthalene (e. g. decahydronaphthalene, tetrahydronaphthalene etc.).

(3) Naphthenes, naphthenic acid, etc.

(*c*) Of mixed type such as oxygen and halogen-bearing derivatives of indene, hydrindene, hydranthracene, etc.

II. "Heterogeneous ring" type compounds:

(*a*) Of the aromatic or allied type including oxygen and halogen-bearing derivatives of pyridine, quinoline, etc.

(*b*) Other types such as oxygen and halogen-bearing derivatives of furan and its derivatives and of thiophene, pyrrole, etc.

Included in Class II are two principal types of compounds, viz: Compounds in which all of the ring structures are of the heterogeneous type and compounds containing both heterogeneous ring structures and carbon ring structures.

The foregoing compounds may also be classified according to the nature of the attachment of the oxygen to the compound, viz:

I'. Directly attached to one or more carbon atoms, as in the case of:

(1') Ethers and analogus compounds.

(2') Compounds containing the ≡C—OH radicle, such as alcohols and other derivatives of carbinol (including phenols, cresols, naphthols etc.).

(3') Compounds containing the carbonyl (=C=O) radicle, such as aldehydes, ketones, organic acids, esters and salts of organic acids, thio-acids and esters of thio-acids.

(4') Compounds in which oxygen forms a part of the ring structure, e. g. furan and its derivatives, anthraquinone, etc.

II'. Indirectly attached through the means of some other atom, i. e., in the form of an inorganic radicle, e. g.:

| | |
|---|---|
| Amide | Phosphate |
| Arsenate | Phosphite |
| Arsenite | Sulphate |
| Chlorate | Sulphite |
| Chlorite | Sulphinic acid |
| Cyanate | Sulphone |
| Hydroxylamine | Sulphonic acid |
| Hypochlorite | Sulphoxide |
| Nitrate | Thiocyanate |
| Nitrite | Isothiocyanate |
| Nitro | Thio-sulphate |
| Nitroso | Thio-phosphate |
| Perchlorate | Isocyanate |

The halogen and oxygen-bearing organic ring compounds of the ester and salt type include compounds of the aromatic type which may be classified as follows:

1. Esters and salts of an aromatic acid;
2. Esters formed by the combination of a phenol, cresol, naphthol, etc. with an organic acid of either the fatty or aromatic type;
3. An ester formed by the combination of an aromatic alcohol (either mono-hydric or polyhydric) with an organic acid of either the fatty or aromatic type.

In addition to the substituents containing oxygen, other substituents may also be present without destroying, and in certain cases, improving the effect on the lubricating qualities of the oil such as other aryl groups, alkyl groups, and amino and substituted amino groups, imino, azo, hydrazo, hydrazine, nitrile, mercapto, sulphide, polysulphide.

Specific examples of compounds of the various classes described above are halogen derivatives of the compounds listed below. These derivatives may be substitution products, addition products, or both. They may be formed by halogenation of the compound listed, or of intermediate compounds or by some other method.

| | *Class* |
|---|---|
| Acetanilide | I(a)—I'(3') |
| Acetophenone | I(a)—I'(3') |
| Aluminum phenyl mercapto stearate | I(a)—I'(3') |
| Aluminum phenyl stearate | I(a)—I'(3') |

| | |
|---|---|
| Amyl salicylate | I(a)—I'(2') and (3') |
| Amino phenol | I(a)—I'(2') |
| Anethole | I(a)—I'(3') |
| Aniline oleate | I(a)—I'(2') |
| Aniline stearate | I(a)—I'(2') |
| Anthraquinone | I(c)—I'(2') |
| Anthranol | I(a)—I'(2') |
| Azobenzoic acid | I(a)—I'(3') |
| Azophenol | I(a)—I'(2') |
| Benzaldehyde | I(a)—I'(3') |
| Benzaldoxime | I(a)—II' |
| Benzamide | I(a)—II' |
| Benzene sulphonic acid | I(a)—II' |
| Benzene sulphoxide | I(a)—II' |
| Benzil | I(a)—I'(2') |
| Benzoic acid | I(a)—I'(3') |
| Benzoin | I(a)—I'(2') and (3') |
| Benzophenone | I(a)—I'(3') |
| Benzyl acetate | I(a)—I'(3') |
| Benzyl alcohol | I(a)—I'(2') |
| Benzyl cyanate | I(a)—II' |
| Benzyl mercapto stearate | I(a)—I'(3') |
| Benzyl naphthenate | I(b) (3)—I'(3') |
| Benzyl nitrate | I(a)—II' |
| Benzyl nitrite | I(a)—II' |
| Benzyl stearate | I(a)—I'(3') |
| Benzyl sulphate | I(a)—II' |
| Benzyl sulphite | I(a)—II' |
| Benzyl sulphone | I(a)—II' |
| Benzyl thio-sulphate | I(a)—II' |
| Borneol | I(a)—I'(2') |
| Bornyl acetate | I(a)—I'(2') |
| Butyl azobenzoate | I(a)—I'(3') |
| Butyl esters of: | |
| Pyrrole carboxylic acid | II(b)—I'(3') |
| Thiophene carboxylic acid | II(b)—I'(3') |
| Butyl benzoate | I(a)—I'(3') |
| Butyl thio-benzoate | I(a)—I'(3') |
| Butyl ester of mercapto resolic acid | I(a)—I'(3') |
| Butyl ester of phenyl acetic acid | I(a)—I'(3') |
| Butyl ester of phenyl stearic acid | I(a)—I'(3') |
| Butyl furoate | II(b)—I'(3') and (4') |
| Butyl mercapto benzoate | I(a)—I'(3') |
| Butyl naphthenate | I(a)—I'(3') |
| Butyl phenyl ketone | I(a)—I'(3') |
| Butyl toluate | I(a)—I'(3') |
| Calcium naphthenate | I(a)—I'(3') |
| Calcium phenyl mercapto stearate | I(a)—I'(3') |
| Calcium phenyl stearate | I(a)—I'(3') |
| Camphor | I(a)—I'(2') |
| Cinnamic acid and esters | I(a)—I'(3') |
| Cresyl acetate | I(a)—I'(3') |
| Cresyl naphthenate | I(b) (3)—I'(3') |
| Cresyl stearate | I(a)—I'(3') |
| Cyclohexanol | I(b) (1)—I'(2') |
| Cyclohexanone | I(b) (1)—I'(3') |
| Decahydronaphthol | I(b) (2)—I'(2') |
| Dibenzoyldimethyl disulphide | I(a)—I'(3') |
| Dibenzoyldimethyl sulphide | I(a)—I'(3') |
| Dibenzoyl disulphide | I(a)—I'(3') |
| Dibenzoyl sulphide | I(a)—I'(3') |
| Dibenzyldisulphide | I(a)—I'(3') |
| Dibenzyl ether | I(a)—I'(1') |
| Dibutyl phthalate | I(a)—I'(3') |
| Di-disulphide of tertiary amyl phenol | I(a)—I'(2') |
| Dihydroxy dibenzyl disulphide | I(a)—I'(2') |
| Dihydroxy diphenyl disulphide | I(a)—I'(2') |
| Dihydroxy diphenyl sulphide | I(a)—I'(2') |
| Dinaphthyl ether | I(a)—I'(1') |
| Dinaphthyl ketone | I(a)—I'(3') |
| Diphenyl acetic acid and esters | I(a)—I'(3') |
| Diphenyl ether | I(a)—I'(1') |
| Dixenyl ether | I(a)—I'(1') |
| Ethyl ester of phenyl acetic acid | I(a)—I'(3') |
| Ethyl naphthyl ether | I(a)—I'(1') |
| Ethyl salicyclic acid and esters | I(a)—I'(2') and (3') |
| Ethyl toluate | I(a)—I'(3') |
| Furan | II(b)—I'(4') |
| Furfural | II(b)—I'(3') and (4') |
| Furil | II(b)I'(3') and (4') |
| Furoin | II(b)—I'(2') (3') and (4') |
| Hexahydrophenyl acetate | I(b) (1)—I'(3') |
| Hexahydrophenyl mercapto stearate | I(b) (1)—I'(3') |
| Hexahydrophenyl stearate | I(b) (1)—I'(3') |
| Hydroxyazobenzene | I(a)—I'(2') |
| Hydroxy-benzyl mercaptan | I(a)—I'(2') |
| Hydroxy-diphenylamine | I(a)—I'(2) |
| Hydroxy-indene | I(c)—I'(2) |
| Hydroxy - methyl - aniline | I(a)—I'(2) |
| Hydroxy - phenyl - hydrazine | I(a)—I'(2') |
| Hydroxyphenyl mercaptan | I(a)—I'(2') |
| Hydroxy-quinoline | II(a)—I'(2') |
| Hydroxythiophene | II(b)—I'(2') |
| Iminophenol | I(a)—I'(2) |
| Indoxyl | I(c) (2)—I'(2) |
| Ketopentamethylene | I(b)—I'(3') |
| Mercapto benzoic acid | I(a)—I'(3') |
| Mercapto rosolic acid | I(a)—I'(3') |
| Methyl salicylate | I(a)—I'(2') and (3') |
| Methyl toluate | I(a)—I'(3') |
| Naphthol | I(a)—I'(2') |
| Naphthol ethyl ether | I(a)—I' |
| Nitrodiphenyl | I(a)—I' |
| Nitrosobenzene | I(a)—II' |
| Nitrosophenol | I(a)—II' |
| Nitrotoluene | I(a)—II' |
| Phenol | I(a)—I'(2') |
| Phenyl acetate | I(a)—I'(3') |
| Phenyl acetic acid | I(a)—I'(3') |
| Phenyl amyl nitrate | I(a)—II' |
| Phenyl amyl nitrite | I(a)—II' |
| Phenyl amyl ether | I(a)—I'(1') |
| Phenyl benzoate | I(a)—I'(3') |
| Phenyl ethyl alcohol | I(a)—I'(2') |
| Phenyl ethyl chlorate | I(a)—II' |
| Phenyl ethyl chlorite | I(a)—II' |
| Phenyl ethyl cyanate | I(a)—II' |
| Phenyl ethyl ether | I(a)—I'(1') |
| Phenyl ethyl hypochlorite | I(a)—II' |
| Phenyl ethyl perchlorate | I(a)—II' |
| Phenyl ethyl sulphate | I(a)—II' |
| Phenyl ethyl sulphite | I(a)—II' |

| | |
|---|---|
| Phenyl ethyl sulphone | I(a)—II' |
| Phenyl ethyl thiosulphate | I(a)—II' |
| Phenyl hydroxylamine | I(a)—II' |
| Phenyl mercapto stearate | I(a)—I'(3') |
| Phenyl mercapto stearic acid and esters | I(a)—I'(3') |
| Phenyl naphthenate | I(b)(3)—I'(3') |
| Phenyl naphthyl ketone | I(a)—I'(3') |
| Phenyl nitrite | I(a)—II' |
| Phenyl oleate | I(a)—I'(3') |
| Phenyl oxydisulphide | I(a)—I'(3') |
| Phenyl phenol | I(a)—I'(2') |
| Phenyl phenyl-acetate | I(a)—I'(3') |
| Phenyl phenyl-naphthenate | I(b)(3)—I'(3') |
| Phenyl phenyl-stearate | I(a)—I'(3') |
| Phenyl propionic acid and esters | I(a)—I'(3') |
| Phenyl propyl alcohol | I(a)—I'(2') |
| Phenyl stearate | I(a)—I'(3') |
| Phenyl stearic acid | I(a)—I'(3') |
| Pyridine stearate | II(a)—I'(3') |
| Pyrrol stearate | II(b)—I'(3') |
| Sodium phenylmercaptostearate | I(a)—I'(3') |
| Sodium phenylstearate | I(a)—I'(3') |
| Sodium thiobenzoate | I(a)—I'(3') |
| Stearanilid | I(a)—I'(3') |
| Tertiary amyl phenol | I(a)—(I')(2') |
| Thiobenzoic acid | I(a)—I'(3') |
| Toluic acid | I(a)—I'(3') |
| Tricresyl phosphate | I(a)—II' |
| Triphenyl arsenate | I(a)—II' |
| Triphenyl arsenite | I(a)—II' |
| Triphenyl phosphate | I(a)—II' |
| Triphenyl phosphite | I(a)—II' |
| Tri-tertiary amyl phenyl phosphate | I(a)—II' |
| Zinc benzoate | I(a)—I'(3') |
| Zinc phenylstearate | I(a)—I'(3') |

In the following table are given examples of aromatic acids, halogen-bearing derivatives of which may be employed as addition agents in accordance with our invention:

Benzoic acid
Benzoic acid derivatives
- Azobenzoic acid
- Mercapto benzoic acid
- Lauryl benzoic acid Salicylic acid
Salicylic acid derivatives
- Ethyl salicylic acid Carboxylic acid
Carboxylic acid derivatives
- Pyrrole carboxylic acid
- Thiophene carboxylic acid Acetic acid
Acetic acid derivatives
- Phenyl acetic acid
- Diphenyl acetic acid Stearic acid
Stearic acid derivatives
- Phenyl stearic acid
- Phenyl mercapto stearic acid
- Xenyl stearic acid
- Naphthyl stearic acid
- Tolyl stearic acid Furoic acid
Cinnamic acid
Phthalic acid
Toluic acid
Mercapto rosolic acid Among the esters and salts, halogen derivatives of which are likewise suitable for use as addition agents, are the esters and salts which may be derived from the aromatic acids listed immediately above and mono and polyhydric alcohols, or other hydroxy compounds (including phenols). Specific examples of such alcohols and hydroxy compounds are those specifically identified under (6) on page 5.

Among the salts of aromatic acids, the halogen-bearing derivatives of which may also be employed as addition agents, are the salts of the aromatic acids listed above, including the sodium, calcium, aluminum, magnesium, zinc and lead salts, and salts derived from ammonia, substituted ammonias, and other organic bases such as quinoline and pyridine.

A very important group of esters, halogen-bearing derivatives of which are particularly suited for use as addition agents, especially in certain types of lubricants, are the esters of alcohols of the benzenoid type. Specific examples of such alcohols are the following:

Benzyl alcohol
Phenyl ethyl alcohol
Benzhydrol
Tri phenyl carbinol
Phenyl propyl alcohol
Phenyl benzyl alcohol
Furfuryl alcohol
Naphthobenzy alcohol
Cinnamyl alcohol This class of esters may be derived from alcohols of the benzenoid type, such as those listed above and organic acids, either aliphatic or aromatic or from such alcohols and inorganic acids. Examples of such organic and inorganic acids are those listed under (6) (b) on page 5.

The class of unsaturated oxygen compounds is particularly suited, after halogenation or halogen treatment, for use as addition agents in accordance with our invention. The following is a classification of these unsaturated oxygen compounds along with specific examples of the various groups within this sub-class:

(1) Unsaturated alcohols, e. g.—
- Vinyl ethyl alcohol
- Allyl alcohol
- Crotonyl alcohol
- Oleyl alcohol
- Propargyl alcohol (2) Unsaturated aldehydes, e. g.—
- Acrolein
- Crotonaldehyde
- Hexadienal
- Octatrienal
- Citral
- Propargylic aldehyde (3) Unsaturated ketones, e. g.—
- Allyl acetone
- Di-allyl ketone
- Mesityl oxide
- Phorone
- Vinyl lauryl ketone
- Acetylenic ketones (e. g. $R—C\equiv C—CO—R'$) such as:
  - Allylene methyl ketone
  - Allylene lauryl ketone
- Ketenes
  - Ketene
  - Acetyl ketene (4) Unsaturated ethers, e. g.—
- Di-vinyl ether
- Di-allyl ether
- Allyl ethyl ether
- Vinyl ethyl ether
- Allyl iso-amyl ether
- Allyl lauryl ether
- Propargyl ethyl ether (5) Unsaturated acids, e. g.—
- Vinyl acetic acid
- Vinyl acrylic acid
- Vinyl glycolic acid
- Acrylic acid
- Crotonic acid
- Oleic acid
- Linoleic acid
- Maleic acid
- Fumaric acid
- Linolenic acid
- Elaeostearic acid
- Propiolic acid
- Stearolic acid (6) Unsaturated esters, e. g.—

(a) Esters of unsaturated acids (e. g. those listed under (5) above as well as unsaturated aromatic acids such as cinnamic and coumaric) with mono- and poly-hydric alcohols, or other hydroxy compounds (including phenols). Examples of such alcohols and hydroxy compounds are:
- Methyl alcohol
- Ethyl alcohol
- Propyl alcohols
- Butyl alcohols
- Amyl alcohols
- Lauryl alcohols
- Cetyl alcohols
- Benzyl alcohol
- Furfuryl alcohol
- Tetrahydrofurfuryl alcohol
- Ethylene glycol
- Propylene glycol
- Di-ethylene glycol
- Glycerol
- Erythritol
- Phenol
- Polyhydroxy-benzenes
- Alkylated phenols
- Naphthols
- Unsaturated alcohols (e. g. those listed under (1) above)

(b) Esters of unsaturated alcohols (e. g. those listed under (1) above) with organic acids, either aliphatic or aromatic, or with inorganic acids. Examples of such acids are aliphatic acids, including—

Saturated acids, such as:
- Acetic acid
- Propionic acids
- Butyric acids
- Lauric acids
- Palmitic acid
- Stearic acid
- Oxalic acid
- Citric acid
- Lactic acid
- Glycolic acid
- Malonic acid
- Unsaturated acids, such as those listed under (5) above.

Aromatic acids, including:
- Benzoic acid
- Phthalic acids
- Salicylic acid
- Anthranilic acid
- Cinnamic acid Cyclo-aliphatic acids, including:
- Naphthenic acids
- Hexahydrobenzoic acid Heterocyclic acids including:
- Furoic acid
- Pyrrol carboxylic acids Inorganic acids, including:
- Hydro-halogen acids
- Oxy-halogen acids
- Sulphurous acid
- Sulphuric acid
- Thiosulphuric acid
- Carbonic acid
- Thiocarbonic acids
- Hydrogen sulphide
- Phosphorous acid
- Thiophosphoric acids
- Phosphoric acid
- Thiophosphoric acids
- Cyanic acid
- Thiocyanic acid
- Hydrocyanic acid
- Boric acid (7) Salts of unsaturated acids, including the—
- Ammonium and substituted ammonium
- Sodium
- Aluminum
- Calcium
- Magnesium
- Zinc
- Lead
- Salts of unsaturated acids generally, and more specifically of such acids as those listed under (5) above and of unsaturated aromatic acids.

In addition to the compounds listed above, commercial products comprising complex mixtures of unsaturated oxygen-bearing organic compounds may be used as the "unsaturated" reactant. Examples of such materials are the fatty oils of unsaturated character, e. g.:
- Castor oil
- China-wood oil
- Corn oil
- Cottonseed oil
- Croton oil
- Lard oil
- Linseed oil
- Menhaden fish oil
- Rape seed oil
- Soya bean oil
- Sperm oil Useful additional unsaturated oxygen compounds which may be derived from any of the above fatty oils are, e. g.—

(1) Acids, extracted from the oils by direct hydrolysis, or by saponification and subsequent hydrolysis, or otherwise.

(2) Esters, produced by esterifying the acids of (1) e. g. to form esters analogous to any of those listed under (6) in Table No. 2.

(3) Soaps, produced by saponifying the oils directly or by neutralizing the acids of (1) with alkalies, e. g. to form salts analogous to those listed under (7) in Table No. 2.

The unsaturated oxygen compounds are of particular importance and may, therefore, be classified in further detail according to the nature of the attachment of the oxygen atom to the molecule, viz:

*Table No. 3*

I'. Directly attached to one or more carbon atoms, as in the case of:
- (1') Ethers and anologous compounds
- (2') Compounds containing the —C—OH radicle, such as alcohols and other derivatives of carbinol (including phenols, cresols, naphthols etc.)
- (3') Compounds containing the carbonyl C=O radicle, such as amides, aldehydes, ketones, organic acids, esters and salts of organic acids (including such salts of both inorganic and organic bases), thio-acids and esters and salts of thio-acids
- (4') Compounds in which oxygen forms a part of the ring structure, e. g. furan and its derivatives, etc.
- (5') Compounds with an inorganic radicle where the oxygen is directly attached to a carbon atom, e. g.—
  - Arsenites
  - Hypochlorites
  - Phosphites
  - Thiophosphates
  - Thiophosphites
  - β-hydroxylamines
  - Borates II'. Indirectly attached through the means of some other atom, i. e., in the form of an inorganic radicle, e. g.—
- Arsenate
- Chlorate
- Chlorite
- Cyanate
- α-hydroxylamine
- Nitrate
- Nitrite
- Nitro
- Nitroso
- Oxime
- Perchlorate
- Phosphate
- Sulphate
- Sulphite
- Sulphinic acid
- Sulphone
- Sulphonic acid
- Sulphoxide
- Thiophosphate
- Thiophosphite
- Thio-sulphate (*Note.*—This class includes salts of organic bases with inorganic oxy-acids.)

In addition to the unsaturated compounds above described, certain unsaturated cyclic compounds are also of use, such as the cyclo-olefines (e. g. cyclo-hexene) and derivatives of them.

As a matter of convenience, the halogen and oxygen-containing substituted diphenyls, as well as the halogen and oxygen-containing substituted benzenes where two or more phenyl groups are directly linked, may be inclusively referred to as halogen and oxygen-containing substituted polyphenyls.

This invention also contemplates the use of halogen bearing acids (and salts and esters derived from them) which may be derived from compounds formed by condensing unsaturated acids (such as those included among the unsaturated oxygen-bearing compounds referred to above) with an aromatic compound in the presence of a catalyst such as anhydrous aluminum chloride. It also contemplates the use of such halogen-bearing salts and esters as may be derived from compounds formed by similarly condensing unsaturated salts and esters (such as those included among the unsaturated oxygen-bearing compounds referred to above) with an aromatic compound.

Examples of other halogen-bearing aromatic acids, esters and salts of the type contemplated hereby (for example those which may be derived from compounds formed by condensing an aromatic acid, ester, or salt, with an unsaturated aliphatic compound) will be found in the copending application of Carl F. Prutton, Ser. No. 216,153, filed June 27, 1938.

As previously indicated, the foregoing so-called addition agents may, for most uses, be added in minor amounts to other lubricants such as mineral oil, fish oil, lard oil, castor oil, rape-seed oil, etc., and in some cases, depending upon the character of use, as well as the character of the selected agents, the latter may be effectively used in their pure state.

The optimum amount of the halogen compound to be employed is usually dependent upon various considerations such as its cost, the character of the selected compounds, the character of the addition agent to which the same is added and more particularly, the character of the use to which the same is put. For most uses, since the cost of such halogen compounds is usually considerably greater than lubricants such as mineral oil, optimum results are obtained by using minimum quantities to these halogenated addition agents. For the purpose of lubricating and reducing the friction between relatively moving parts of an internal combustion engine such as crank case bearings, piston and cylinder surfaces, as well as piston rings and valves, a composition according to our invention comprises a major proportion of a suitable oil base such as mineral oil and concentrations of from one-fourth of 1% to 2% of halogen compounds of the above defined type. If the valve structure of the engine is to be lubricated separately from the remainder of the mechanism by means acting in an auxiliary fashion such as by the addition of the lubricating composition to the engine fuel, the composition for such purposes will preferably contain a larger amount of such halogen compounds, i. e. from about 2% to about 10%.

When lubricating bearing surfaces such as gears and the like where extreme temperatures are usually not encountered a composition comprising a major proportion of a suitable oil base and a total of less than about 20% of at least one halogen and oxygen-containing organic compound of the enumerated class will be found very satisfactory.

When combined with a lubricating oil such as mineral oil, the optimum amount of the halogen compound to be employed will depend largely upon the halogen content of the particular compound, its physical characteristics and especially its effect on the viscosity of the oil to which it is added. When addition agents of the above enumerated class having very low viscosity are employed, and added to lubricants such as mineral oil, the limit of the amount of such compounds which may be added and which will produce improved results depends in a large measure upon the reduction in viscosity of the composition caused by the addition of such compounds. When, however, the more viscous compounds are employed, or where the particular use does not require thick film lubrication, the so-called addition agents may, as previously indicated, be employed in their pure state.

Experiments have shown that when compounds which readily hydrolize, such as chlorinated open chain compounds, are added to the oily base, hydrolysis will take place to such an extent that the metal parts of any machine being lubricated will be seriously attacked and corroded by the acid generated. On the other hand, the addition of chlorinated organic ring compounds of the above enumerated class does not cause corrosion.

Certain of the halogen and oxygen-bearing open chain or aliphatic compounds, in their pure state, or when added to a suitable base do result, however, in a lubricant particularly suitable for certain purposes. Examples of the foregoing are halogenated fatty oils such as chlorinated cottonseed oil and chlorinated cocoanut oil. As above indicated, such compounds readily hydrolize and while thus not preferred as a lubricant for use in the crank case of internal combustion engines, are nevertheless, admirably suited for use as lubricants in metal working such as drawing, extruding, rolling, etc., where the lubricant is in contact with the metallic surface for only relatively a short length of time and where the very slight amount of corrosion which may result is not particularly objectionable. Furthermore, such compounds are admirably suited for use in lubricants in die drawing or similarly working certain corrosion resistance materials such as stainless steel and the like.

With regard to the stability of the organic ring compounds contemplated, the most resistant to hydrolysis of the halogen are those in which the halogen is directly attached to an atom which is part of a benzenoid ring structure. Examples of such ring structures are aryl groups such as the phenyl and naphthyl groups. In any case, for most uses, it is preferred to have the halogen attached to an atom which is part of an organic ring structure and especially a six-membered organic ring structure.

The compositions comprising our invention have certain advantages when used as a lubricant of which the following may be mentioned:

*First.*—By the use of this composition, it is possible to extend the pressure range between the bearing surfaces because of the reduced tendency for bearing surfaces so lubricated to become scored or to seize at higher pressures than are allowable with ordinary lubricants.

*Second.*—The friction between the bearing surfaces is reduced, especially in the higher pressure range, below that obtained with ordinary lubricants.

In the foregoing description of our invention we have listed a large number of classes and specific examples of addition agents, the halogen-bearing derivatives of which are contemplated for use as addition agents in the preparation of lubricating compositions in accordance with our invention. Many of these materials themselves, i. e., the unhalogenated materials named, as well as the halogen-free analogs of the halogenated or halogen-bearing materials named, may be employed to advantage in lubricating compositions since many of such possess valuable properties as addition agents.

These unhalogenated materials may be used as the sole addition agent to impart improved lubricating properties to a mineral oil (or other lubricating medium) or may advantageously be used in conjunction with other addition agents, such as organic halogen compounds, organic phosphorus compounds (e. g. esters of phosphoric and phosphorous acids), organic sulphur compounds, soaps, oiliness agents, oxidation inhibitors, viscosity index improvers, or such other addition agents as may be employed for the same or other purposes.

Other modes of applying the principle of our invention may be employed instead of the one explained, change being made as regards the materials employed, provided the ingredients stated by any of the following claims or the equivalent of such stated ingredients be employed.

We, therefore, particularly point out and distinctly claim as our invention:

1. A lubricating composition comprising a major proportion of mineral lubricating oil and a minor proportion of a halogen-bearing ester of an unsaturated alcohol and an aromatic acid.

2. A lubricating composition comprising in combination, a major proportion of a suitable oil base and a minor proportion of a halogenated ester of an aromatic acid.

3. A lubricating composition comprising in combination, a major proportion of a suitable oil base and a minor proportion of a halogenated alkyl ester of an aromatic acid.

4. A lubricating composition comprising in combination, a major proportion of a suitable oil base and a minor proportion of a halogenated ester of a hydroxy aromatic acid.

5. A lubricating composition comprising in combination, a major proportion of a suitable oil base and a minor proportion of a halogenated ester of a hydroxy benzoic acid.

6. A lubricating composition comprising in combination, a major proportion of a suitable oil base and a minor proportion of a halogenated ester of a hydroxyl aryl carboxylic acid.

7. A lubricating composition comprising in combination, a major proportion of a suitable oil base and a minor proportion of a halogenated alkyl ester of a hydroxy aryl carboxylic acid.

8. A lubricating composition comprising in combination, a major proportion of a suitable oil base and a minor proportion of a halogenated alkyl ester of a hydroxy aromatic acid.

9. A lubricating composition comprising in combination, a major proportion of a suitable oil base and a minor proportion of a halogenated alkyl ester of a hydroxy benzoic acid.

10. A lubricating composition comprising in combination, a major proportion of a suitable oil base and a minor proportion of a halogenated ester of salicylic acid.

11. A lubricating composition comprising in combination, a major proportion of a suitable oil base and a minor proportion of a halogenated alkyl ester of salicylic acid.

12. A lubricating composition comprising in combination, a major proportion of a suitable oil base and a minor proportion of halogenated methyl salicylate.

13. A lubricating composition comprising in combination, a major proportion of a suitable oil base and a minor proportion of chlorinated methyl salicylate.

CARL F. PRUTTON.
ALBERT K. SMITH.